R. HUTCHINSON.
PROCESS FOR AGING WHEATEN FLOUR TO IMPROVE ITS BAKING QUALITIES.
APPLICATION FILED MAR. 19, 1921.

1,422,102.

Patented July 11, 1922.
2 SHEETS—SHEET 1.

INVENTOR
Robert Hutchinson
by Arthur J. Stephens
Attorney.

R. HUTCHINSON.
PROCESS FOR AGING WHEATEN FLOUR TO IMPROVE ITS BAKING QUALITIES.
APPLICATION FILED MAR. 19, 1921.

1,422,102.

Patented July 11, 1922.
2 SHEETS—SHEET 2.

INVENTOR.
Robert Hutchinson.
by Arthur Stephens
Attorney.

UNITED STATES PATENT OFFICE.

ROBERT HUTCHINSON, OF NOTTINGHAM, ENGLAND.

PROCESS FOR AGING WHEATEN FLOUR TO IMPROVE ITS BAKING QUALITIES.

1,422,102. Specification of Letters Patent. Patented July 11, 1922.

Application filed March 19, 1921. Serial No. 453,687.

*To all whom it may concern:*

Be it known that I, ROBERT HUTCHINSON, a subject of the King of Great Britain and Ireland, residing at 15 Parkinson Street, Nottingham, England, have invented new and useful Improved Processes for Aging Wheaten Flour to Improve its Baking Qualities, of which the following is a specification.

This invention relates to means for improving the strength or baking qualities of wheaten flour.

It has been observed that strong wheats are only produced in climates which ensure a rapid ripening or final drying out of the grain and that even home-grown wheat shows marked improvement in a favourable summer.

It is also well known, that the "strength" factor for flour and, to a less extent, for wheat is quite appreciably enhanced by storage for several weeks or months and that such aging or maturing is more rapid and more pronounced if the storeroom is warm. The cost of prolonged storage is however a very important consideration, and a further objection is a loss of weight by evaporation.

A study of the effect of heat on wheat, flour dough and wet gluten at ordinary atmospheric pressure reveals the following facts:—

(1). That at temperatures well below 100° C., wet gluten is rapidly coagulated to a horny mass; when wheat, flour or dough is so heated, no wet gluten can be washed out therefrom, the coagulated gluten being washed away with the starch.

(2). That all stages of partial coagulation between fresh wet gluten and this hard dry gluten can be induced by suitable control of the temperature and time of heating.

(3). That the coagulation is irreversible.

(4). That at any given temperature the rate of coagulation depends on the proportion of moisture present, i. e., the drier the material the slower the rate of coagulation.

(5). That for any given moisture-content the temperature coefficient of coagulation, i. e., the increase of the rate of coagulation for a definite small rise of temperature, is very high.

Taking flour of average moisture content say 15 per cent, it is found that at normal temperatures storage for months is necessary before any appreciable improvement in the gluten can be detected. When the storeroom is warm, e. g., 25° C. to 30° C., the same improvement is completed in a few weeks. At 60° C. a few hours suffice to coagulate the gluten completely. At still higher temperatures complete coagulation occurs with extreme rapidity.

The object of this invention is to impart "strength" to the gluten proteins by effecting a slight heat coagulation under completely controlled conditions.

Such control is accomplished according to our invention by utilizing the further observations, first that at any temperature the heat coagulation is completely arrested when the fluid or gaseous pressure to which the material (wheat, wheaten stock, flour dough or wet gluten) is subjected is reduced below that of saturated aqueous vapour at that temperature, i. e., when the water in the material is being boiled out of it; second, that at any temperature the rate of coagulation increases as the pressure increases above this critical boiling point value.

According to our invention therefore, we improve the "strength" or baking qualities of wheaten flour by subjecting wheat, wheaten stock, flour or dough to a heat treatment which is controlled by varying the fluid pressure exerted on the materials.

We will now proceed first to describe how our invention may be carried into effect in the case of wheat prior to milling.

Two kinds of heat treatment of wheat prior to milling have hitherto been in common use viz:—

(1). Conditioning, in which damped wheat is dried by a current of hot air. The purpose is to toughen the outer layers of the berry to facilitate their removal in the milling process. The temperature of the grain is not raised to any considerable extent, and any improvement in the "strength" factor is negligible.

(2). Hydrolizing, in which the wheat is first damped and is then passed through a chamber fitted with heat-exchanging devices and then through a cooling-chamber. The purpose in this case also, is to "condition" the grain, but it has also recently been claimed that an improvement in "strength" is sometimes effected.

By the application of our invention to wheat we are enabled to effect such improvement in the hydrolizer treatment under complete control as hereinafter described.

The higher temperature-coefficient of the coagulation of the gluten proteins necessitates the avoidance of any local overheating of the grain. For this purpose either (1) we use suitable conveying or agitating devices to keep the material moving or to mix it thoroughly while it is being heated, or (2) we effect the actual preliminary transfer of heat to the material under such conditions of low hydrostatic pressure as will prevent any coagulation taking place at this stage, whereupon the supply of heat is cut off and the desired coagulation is induced by suitably raising the pressure for a definite time while the material is still sufficiently hot. In the application of this second method we have experienced no difficulty in attaining the desired temperature even when using a very high vacuum as in the later stages of the desiccation of the material its temperature is considerably higher than that of the steam issuing from it.

To enable the working of the process to be more readily understood, reference is directed to the accompanying drawings, in which—

Figure 1:
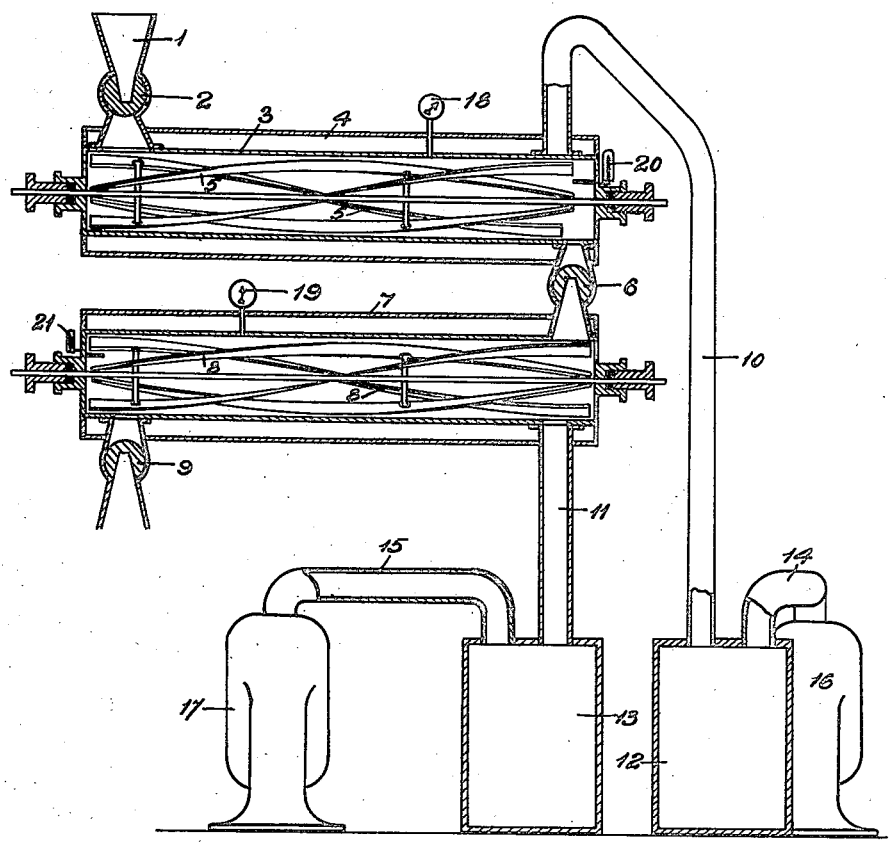
Figure 1 illustrates in part sectional elevation a plant for the continuous treatment of wheat according to one mode of procedure.

Referring now to Figure 1; wheat which has preferably been already dry-cleaned is fed through a hopper 1 and a valve 2 into a horizontal cylinder 3 fitted with a steam or hot-water jacket 4 and is moved through the cylinder by a worm 5 to an outlet valve 6 through which it passes by gravity to a second similar jacketed cylinder 7. A worm 8 moves the wheat through the cylinder 7 to an outlet valve 9. The cylinders 3, 7 communicate respectively by pipes 10, 11, each through a catch-pot 12, 13, and a pipe 14, 15, with a vacuum pump 16, 17. A condenser either of the surface or of the jet type may be interposed between the catch-pot and the pump in each case. The cylinders 3, 7 are fitted respectively with vacuum gauges 18, 19, and with electrical or other thermometric devices 20, 21 near the outlet ends. The valves 2, 6, 9, are of any suitable or usual type adapted to operate without materially effecting the degree of vacuum in the cylinders 3, 7 and are shown in the drawing as rotatable barrels each having one or more sockets which are successively filled and emptied as the barrels rotate. The pump 16 is arranged to maintain in the cylinder 3 a vacuum sufficiently low to prevent any ebullition in the wheat even at the highest temperature attained as indicated by the thermometer 20. The pump 17 maintains a degree of vacuum in the cylinder 7 which is sufficiently high to promote ebullition from the wheat and so arrest coagulation.
The pitch and speed of the worm 5 are such that the desired temperature of the wheat is indicated by the thermometer 20. The temperature indicated by the thermometer 21 should be sufficiently low to enable the wheat cooled by the evaporation in the cylinder 7 to be discharged into the atmosphere through the valve 9 without risk of any further coagulation of the gluten. The length of the cylinder 7 or the temperature of the fluid in its jacket may be so arranged as to enable this result to be attained. As an example of the operation of the process the vacua in the cylinders 3, 7, may be respectively 15 and 29 inches of mercury with the thermometers 20, 21, registering 72°C and 25°C respectively. The cylinder 3 might instead of being under vacuum be at atmopsheric pressure throughout but we have not hitherto found this to give as satisfactory results. Instead of steam or hot water, cooling water might be supplied to the jacket of the cylinder 7, or this jacket might be dispensed with. Alternatively the wheat can be delivered directly from the cylinder 3 into a cooling chamber at atmospheric pressure. The inlet and outlet valves 2 and 6 of the cylinder 3 could be arranged to open and close simultaneously under the control of a thermostatic arrangement actuated from the thermometric device 20.

Figure 2:
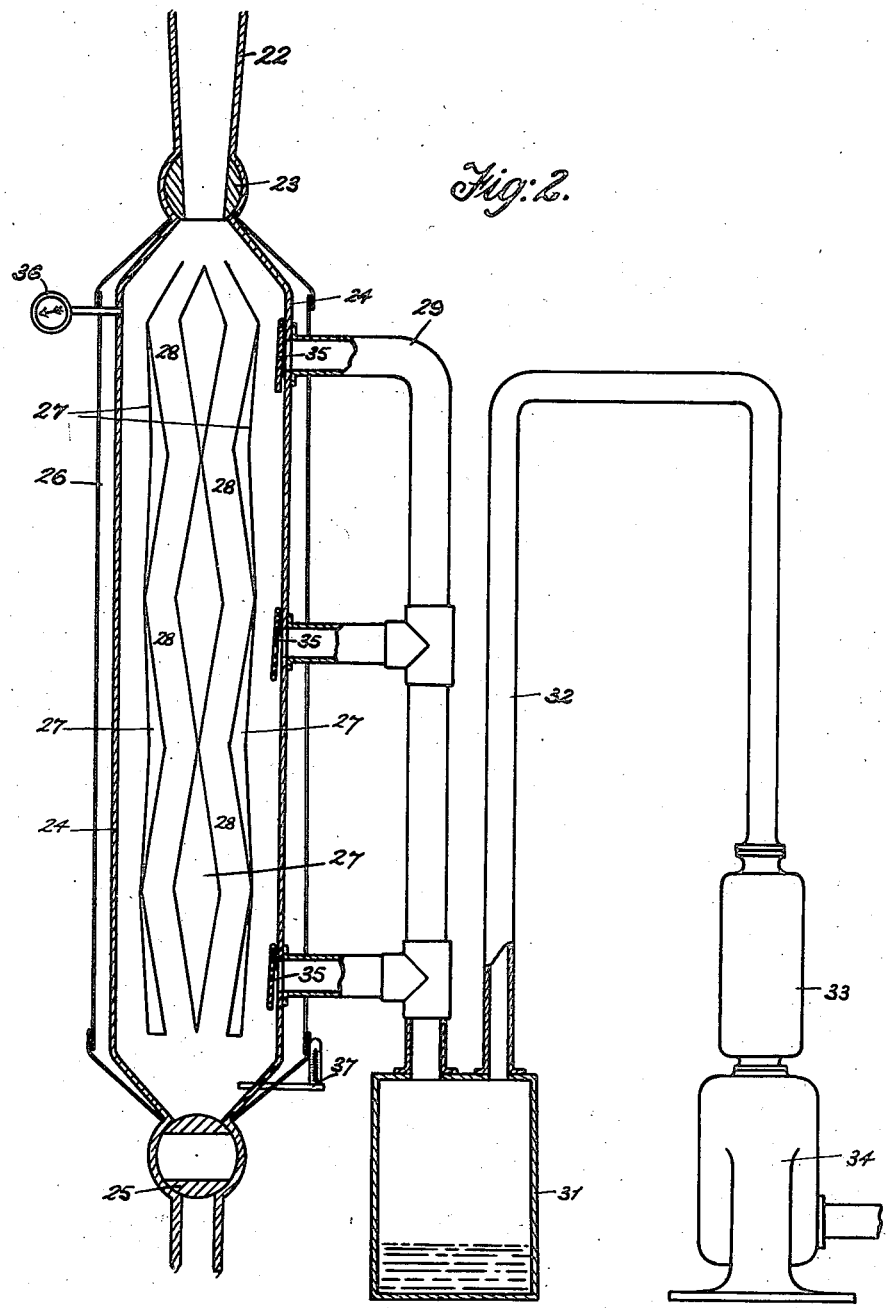
Figure 2 illustrates in part sectional elevation a plant for the intermittent treatment of wheat according to another mode of procedure.

Figure 2 illustrates in part sectional elevation a plant suitable for an intermittent treatment by a somewhat different procedure. A long vertically-disposed chamber 24 fitted with an inlet valve 23 at the top and an outlet valve 25 at the bottom is adapted to be heated by a jacket 26 and by internal channels 27 through which the heating fluid such as hot water or steam is circulated, or if electric heating is employed, the jacket 26 and the channels 27 are formed as casings enclosing the electric heating device. It is desirable that the transference of heat to the wheat shall be as rapid as possible, and for this purpose a maximum area of contact of the wheat with the hot walls of the jacket 26 and channels 27 is necessary. The drawing illustrates one way of accomplishing this, the channels 27 being constructed of zig-zag or corrugated sheet metal forming zig-zag or tortuous spaces 28 to receive the wheat. Any other suitable and efficient type of heat-exchanger may, however, be employed, such as that commonly used in a wheat hydrolizer.

The chamber 24 communicates by pipes 29 with a vertical pipe 30 leading to a catch-pot 31 which communicates by a pipe 32 and a condenser 33 of either surface or jet type with the vacuum pump 34. Baffles or grids 35 prevent the passage of wheat into the pipes 29. The valve 25 being closed, wheat is fed from a hopper 22 through the valve 23 until the chamber 24 is full and the valve 23 is closed. The pump 34 is then started and the heat is turned on. A vacuum gauge 36 on the chamber 34 should indicate a vacuum sufficiently high to maintain ebullition in the wheat while it is being heated. When the desired temperature, as indicated by a thermometric device 37 is reached, the heat is turned off the vacuum is thereupon lowered for a definite time to allow the desired coagulation, and is then raised again to its former value, and so maintained until the wheat is cool enough to be discharged into the atmosphere without risk of further coagulation. In some cases the wheat might be discharged straight from the high vacuum into a cold vessel at atmospheric pressure. Although a continuous treatment has been described with reference to Figure 1, and an intermittent treatment with reference to Figure 2, it will be appreciated that each apparatus could readily be adapted for either type of treatment.

In adapting the mode of procedure described with reference to Figure 2 to a continuous treatment the heating arrangement would preferably be such as to subject the wheat to a progressively higher temperature in its descent through the chamber and the subsequent subjection of the wheat to different degrees of vacuum would be accomplished in other chambers similar to the chamber 24. Wheat which has been treated according to the invention may be brought into suitable condition for milling by restoring approximately the amount of water which has been removed (for which the washing and whizzing devices usual in flour mills may be employed), and allowing to stand overnight or for a longer period until the outer coat of the grains is dry. This treatment is found to condition the wheat very effectively. Alternatively, in the method described with reference to Figure 1 the wheat may be damped prior to the treatment so that its moisture content after the treatment is approximately normal.

Obviously a hydrolizer of ordinary construction could be readily adapted for effecting a treatment according to the invention by employing it in association with devices for varying the hydrostatic pressure on the wheat during or after the hydrolizer treatment. The coagulation of the gluten proteins could then be controlled completely. We contemplate for example, the substitution for the usual cooling chamber of the hydrolizer of a chamber in which the cooling is induced by the use of a high vacuum.

Although the detailed description has been limited to the treatment of wheat it will be readily understood that the plant in each case could with little variation be adapted to the similar treatment of wheaten stock, or flour and removed moisture could if desired be restored by spraying or otherwise, or by the baker at the doughing stage. It will further be obvious that dough enclosed in a vacuum-tight vessel fitted with heating devices could be treated according to the invention. The process according to this invention has the very great advantage that the addition of chemicals so-called "improvers" may be entirely obviated, nothing but water being added or removed. The process, in fact follows Nature's method of producing "strength" in the ripening grain. The improvement is similar in kind to but greater in degree than that produced by aging and is accomplished in a few minutes instead of in a few weeks or months. The process might be combined with the use of "improvers" and yeast foods, such for example as phosphates, persulphates, ammonium salts, common salt, or malt extracts, which would then be incorporated with the water restored after the treatment or with the water added prior to the treatment.

The various bleaching-gases which have been used or suggested such, for example, as ozone, nitrogen oxide, hydrogen peroxide vapour, dry chlorine, or nitrosyl chloride, might also be employed to act on the dehydrated or the finished flour.

What I claim is:—

1. A process for improving the "strength" or baking qualities of wheaten flour in which a wheaten material is subjected to a heat treatment to effect a partial heat-coagulation of the gluten proteins, and such treatment is controlled by varying the fluid pressure exerted on the materials.

2. A process for improving the "strength" or baking qualities of wheaten flour, in which a wheaten material is first heated at atmospheric pressure to effect the partial coagulation and then subjected to a high vacuum to arrest such coagulation.

3. A process for improving the "strength" or baking qualities of wheaten flour in which a wheaten material is subjected to a heat treatment to effect a partial heat-coagulation of the gluten proteins, and such treatment is controlled by varying the fluid pressure exerted on the material, and in which the moisture removed by the operation of the process is restored to the material.

4. A process for improving the "strength" or baking qualities of wheaten flour in which additional moisture is added to a wheaten material and said material then subjected to a heat treatment to effect a partial heat-coagulation of the gluten proteins, such treatment being controlled by varying the fluid pressure exerted on the material and the additional moisture being removed during the operation of the process.

5. A process for improving the "strength" or baking qualities of wheaten flour in which "improvers" or yeast foods incorporated with water, are added to a wheaten material, and said material then subjected to a heat treatment to effect a partial heat coagulation of the gluten proteins, such treatment being controlled by varying the fluid pressure exerted on the material and the additional moisture being removed during the operation of the process.

In witness whereof I have signed my name to this specification.

ROBT. HUTCHINSON.

In the presence of—
JOHN T. JENKINSON,
HENRY HOPKINSON.